United States Patent [19]

Yokota et al.

[11] Patent Number: 5,302,817
[45] Date of Patent: Apr. 12, 1994

[54] X-RAY DETECTOR AND X-RAY EXAMINATION SYSTEM UTILIZING FLUORESCENT MATERIAL

[75] Inventors: Kazuto Yokota; Akihisa Saito; Noriaki Yagi, all of Kanagawa, Japan

[73] Assignee: Kabushiki Kaisha Toshiba, Kanagawa, Japan

[21] Appl. No.: 901,476

[22] Filed: Jun. 19, 1992

[30] Foreign Application Priority Data

Jun. 21, 1991 [JP] Japan .................. 3-150606

[51] Int. Cl.$^5$ .............................. H01J 40/14
[52] U.S. Cl. .................... 250/214 VT; 313/543
[58] Field of Search ............... 250/483.1, 485.1, 486.1, 250/214 VT; 378/57, 185; 313/543, 532; 252/301.4

[56] References Cited

U.S. PATENT DOCUMENTS

| | | | |
|---|---|---|---|
| 4,054,798 | 10/1977 | Watanabe et al. | 250/483.1 |
| 4,057,508 | 0/0000 | Wolfe et al. | |
| 4,263,061 | 4/1981 | Fatuzzo et al. | 250/483.1 |
| 4,704,538 | 11/1987 | Kitada | 250/486.1 |
| 5,022,062 | 6/1991 | Annis | 378/57 |
| 5,126,573 | 6/1992 | Knuepfer et al. | 250/483.1 |

FOREIGN PATENT DOCUMENTS

| | | |
|---|---|---|
| 0175663 | 3/1986 | European Pat. Off. . |
| 0187066 | 7/1986 | European Pat. Off. . |
| 0299409 | 1/1989 | European Pat. Off. . |
| 0311177 | 4/1989 | European Pat. Off. . |
| 0426106 | 5/1991 | European Pat. Off. . |

OTHER PUBLICATIONS

Search Report dated Jan. 21, 1993 for the corresponding European patent application.

*Primary Examiner*—David C. Nelms
*Assistant Examiner*—Que T. Le
*Attorney, Agent, or Firm*—Finnegan, Henderson Farabow, Garrett & Dunner

[57] ABSTRACT

An X-ray detector has a transmission type intensifying screen provided on the X-ray incident area of the detector body and a reflection type intensifying screen provided on the inner wall surface of the detector body except for the X-ray incident area. Visible rays from the transmission type intensifying screen and the reflection type intensifying screen are detected by a photomultiplier installed in the detector body. The transmission type intensifying screen and the reflection type intensifying screen use fluorescent materials such as $Gd_2O_2S:Tb$; $Gd_2O_2S:Tb$, $Ce$; $GD_2O_2S:Tb$, $Yb$; $Gb_2O_2S:Pr$; $BaFCl:Eu$; $BaFBr:Eu$; $La_2O_2S:Tb$; $La_2O_2S:Tb$, $Ce$; $La_2O_2S:Tb$, $Yb$; $La_2O_2S:Pr$; $Y_2O_2S:Tb$; $Y_2O_2S:Tb$, $Ce$; $Y_2O_2S:Tb$, $Yb$; and $Y_2O_2S:Pr$.

9 Claims, 5 Drawing Sheets

X-RAY DETECTOR AND X-RAY EXAMINATION SYSTEM UTILIZING FLUORESCENT MATERIAL

BACKGROUND OF THE INVENTION

Field of the Invention

The present invention relates to an apparatus for examining baggage or the like, using X-rays and a detector of X-rays used in the apparatus.

Discussion of the Related Art

Prior to bringing baggage or packages onto a commercial passage aircraft, such materials are subject to an X-ray examination to secure safe operation of the aircraft. Normally, in such an examination system, X-rays are transmitted through the baggage and attenuated by materials in the baggage. By such transmission X-ray examination system, metallic articles, such as metallic guns, edged weapons, etc., can be detected relatively easily.

By contrast, articles composed mainly of elements with low atomic numbers, such as plastic explosives, drugs, etc., are not readily detected by such transmission X-ray examination systems because X-rays pass through such substances without significant attenuation. In view of this deficiency of transmission X-ray systems, the development of examination systems using the Compton scattering X-rays was undertaken. As known in the art, Compton scattering X-rays are X-rays reflected from substances including elements having lower atomic numbers. Therefore, when baggage or the like is examined using Compton scattering X-rays, it becomes possible to detect plastic explosives, drugs, etc.

In general X-ray examination systems using transmitted X-rays or Compton scattering X-rays have a structure in which transmitted X-rays or Compton scattering X-rays are guided to an X-ray detector. Detected X-rays are converted into visible light using a fluorescent material, and the intensity of the visible light is detected by a photomultiplier. The intensity of the visible light is used to create an image of the article being examined.

Figure 1:
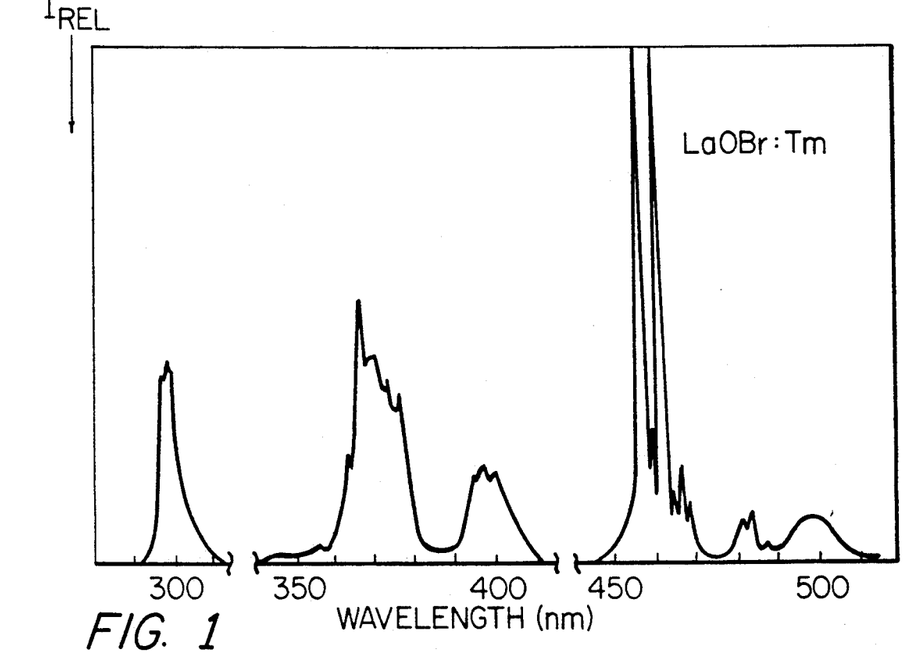
FIG. 1 is a diagram showing the luminous wavelength characteristics of a conventional fluorescent material (LaOBr:Tm)

The X-ray detector described above ordinarily uses a photomultiplier that has a characteristic peak of its spectral sensitivity at approximately 400 nm. Fluorescent materials such as LaOBr:Tb or LaOBr:Tm, are used to convert X-rays into visible light because such materials have a peak of luminous wavelength at around 400 nm. The luminous wavelength characteristic of LaOBr:Tm fluorescent material is shown in FIG. 1.

An X-ray detector using a fluorescent material such as LaOBr:Tb or LaOBr:Tm has a disadvantage that the Compton scattering X-ray cannot be detected with sufficient sensitivity. Therefore, in a conventional Compton scattering X-ray examination system, the intensity of X-rays is increased to a level where sufficient examining accuracy can be obtained, and a clear examination image is obtained. However, when an X-ray examination system is installed in a public place such as an airport baggage examination system, the increase of the intensity of X-rays to be applied results in large systems and an increased risk of exposing humans to X-rays.

SUMMARY OF THE INVENTION

The present invention has been made to overcome problems described above and has as an object to provide an X-ray detector which provides sufficient detection sensitivity by X-rays of relatively low intensity. It is another object of the present invention to provide an X-ray examination system that is small in size, which minimizes the danger of exposing humans to X-rays, and which provides a clear examination image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, there is provided an X-ray detector comprised of a housing, a fluorescent generator mounted in the housing for generating fluorescent output in response to X-rays impinged thereon. A fluorescent converter mounted in the housing measures output of the fluorescent generator with the fluorescent generator including at least one fluorescent material selected from the group consisting of $A_2O_2S:D$ and $BaFX:E$, wherein A is at least one element selected from Gd, La and Y, D is at least one element selected from Tb and Pr, or, D is at least one element selected from Tb and Pr, and at least one element selected from Ce and Yb, X is at least one element selected from Cl and Br, E is Eu or a mixture of Eu and at least one element selected from the group consisting of Ce and Yb.

Preferably, the X-ray detector includes a fluorescent material comprised of a material selected from the group consisting of $Gd_2O_2S:Tb$; $Gd_2O_2S:Tb$, Cl; $Gd_2O_2S:P_r$; $BaFCl:Eu$; $BaFBr:Eu$; $La_2O_2S:Tb$; $La_2O_2S:Tb$, Ce; $La_2O_2S:Pr$; $Y_2O_2S:Tb$; $Y_2O_2S:Tb$; $Y_2O_2S:Tb$, Ce; and $Y_2O_2S:Pr$.

BRIEF DESCRIPTION OF THE DRAWINGS

These and other objects and advantages of this invention will become more apparent and more readily appreciated from the following detailed description of the presently preferred exemplary embodiments of the invention taken in conjunction with the accompanying drawings wherein.

DESCRIPTION OF THE PREFERRED EMBODIMENTS

The fluorescent generator of the X-ray detector and the X-ray examination system of the present invention use at least one fluorescent material having a formula selected from the group consisting of:

$A_2O_2S{:}D$ and $BaFX{:}E$ wherein
A is at least one element selected from Gd, La and Y,
D is at least one element selected from Tb and Pr, or,
D is at least one element selected from Tb and Pr, and at least one element selected from Ce and Yb;
X is at least one element selected from Cl and Br,
E is Eu or mixture of Eu and at least one element selected from the group consisting of Ce and Yb.

More particularly, the fluorescent material preferred for use in accordance with the present invention is a material selected from the group of $Gd_2O_2S{:}Tb$; $Gd_2O_2S{:}Tb$, Ce; $Gd_2O_2S{:}Tb$, Yb; $Gd_2O_2S{:}Pr$; $BaFCl{:}Eu$; $BaFBr{:}Eu$; $La_2O_2S{:}Tb$; $La_2O_2S{:}Tb$, Ce; $La_2O_2S{:}Tb$, Yb; $La_2O_2S{:}Pr$; $Y_2O_2S{:}Tb$; $Y_2O_2S{:}Tb$, Ce; $Y_2O_2S{:}Tb$, Yb; and $Y_2O_2S{:}Pr$.

The elements Ce and Yb are used as activators which have an effect of shortening the afterglow time. As used herein, afterglow time is a time required for the intensity of luminous light to go down to a value of 1/10 its initial value. The Tb activated fluorescent material has a longer afterglow time than the Pr activated fluorescent material. Therefore, activators of Ce and Yb are more effective than the Tb activated fluorescent materials to shorten the afterglow time. The amount of the activators of Ce and Yb is in the ratio of 0.001 wt % to 10 wt % for the total amount of activators.

Figure 2:
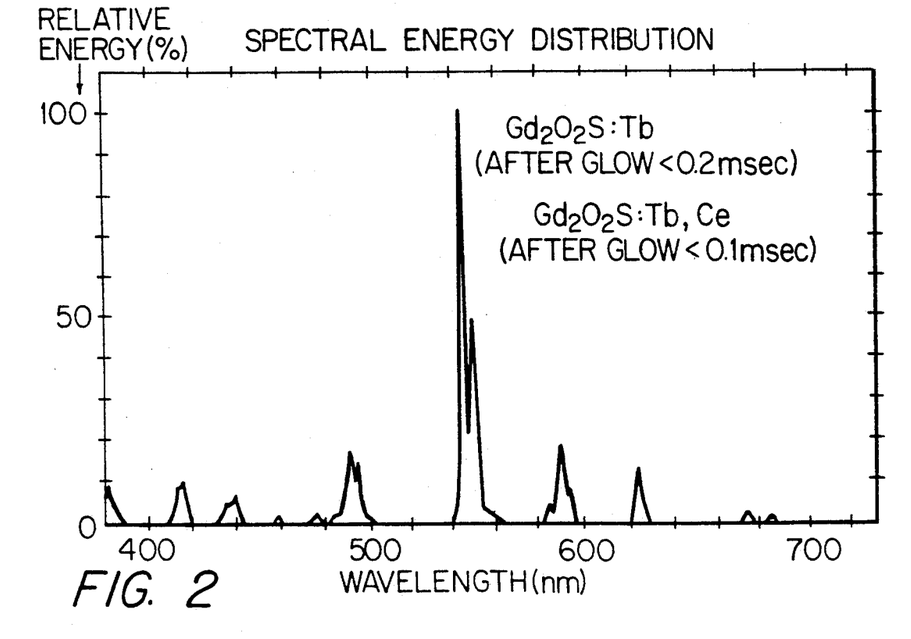
FIG. 2 is a diagram showing the luminous wavelength characteristics of $Gd_2O_2S:Tb$ and $GD_2O_2S:Tb$, Ce.
Figure 3:
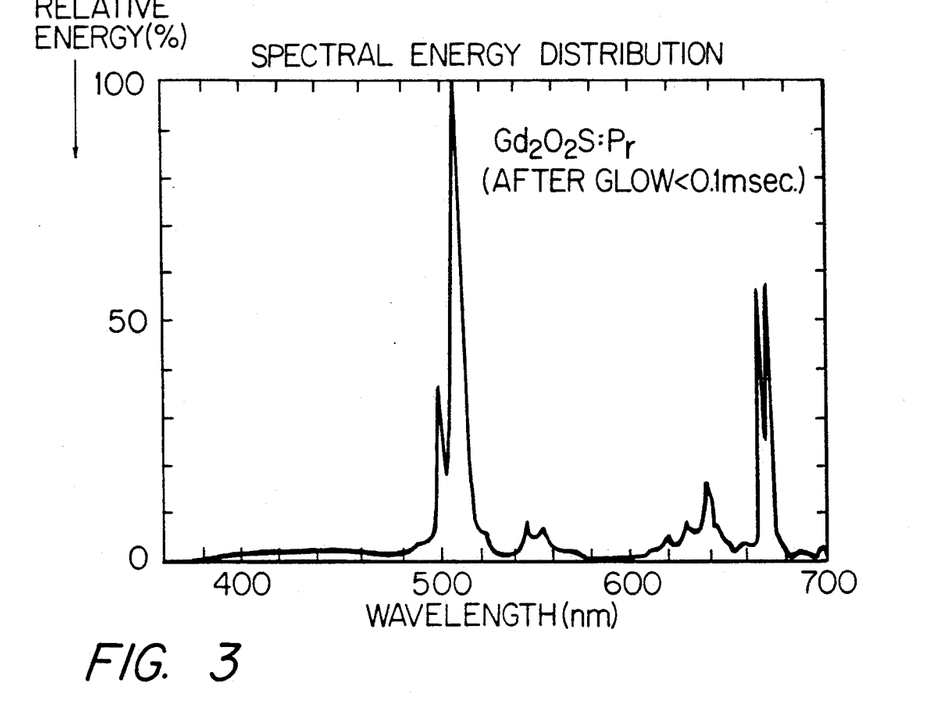
FIG. 3 is a diagram showing the luminous wavelength characteristics of $Gd_2O_2S:Pr$.
Figure 4:
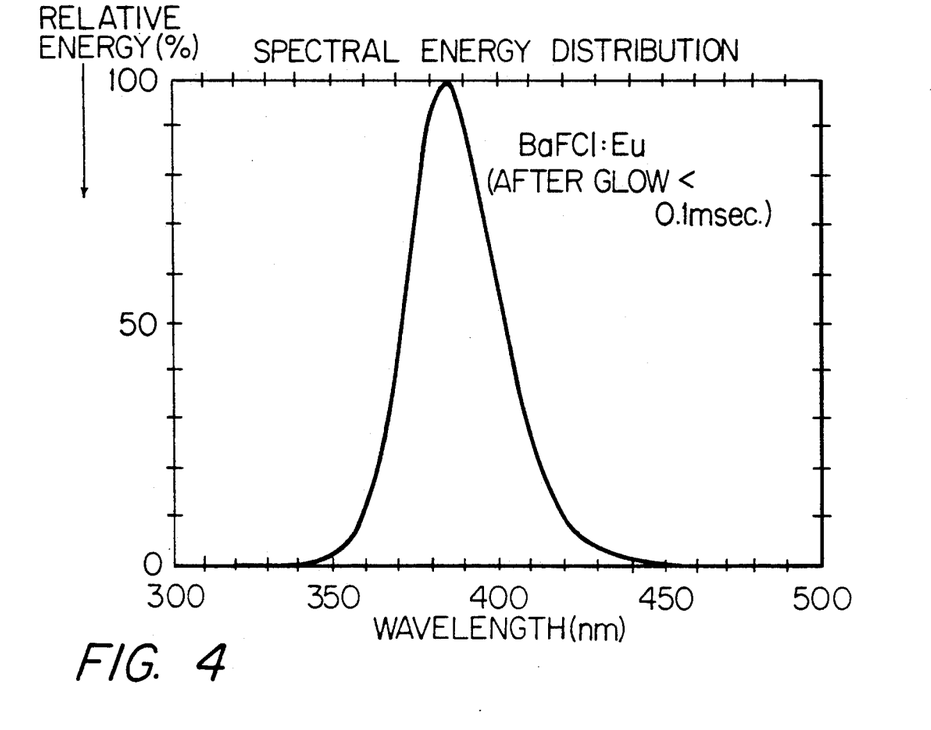
FIG. 4 is a diagram showing the luminous wavelength characteristics of $BaFCl:Eu$.
Figure 5:
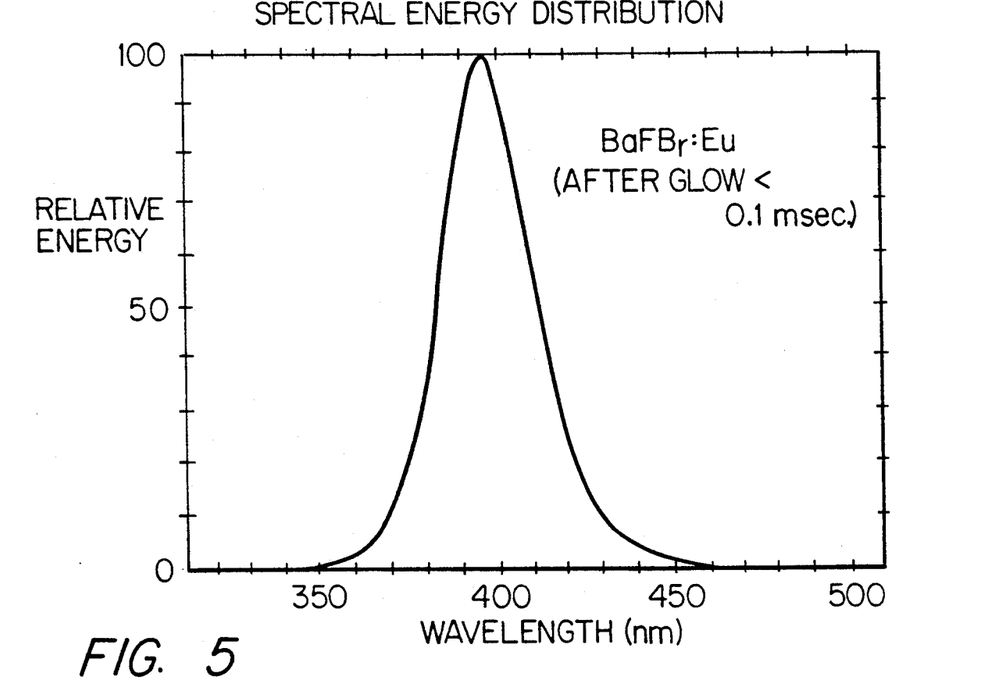
FIG. 5 is a diagram showing the luminous wavelength characteristics of $BaFB_r:Eu$.

Representative luminous wavelength characteristics of the fluorescent materials $Gd_2O_2S{:}Tb$ and $Gd_2O_2S{:}Tb$, Ce are shown in FIG. 2. The luminous wavelength characteristics of $Gd_2O_2S{:}Pr$, $BaFCl{:}Eu$ and $BaFBr{:}Eu$ are shown in FIGS. 3, 4 and 5, respectively. The fluorescent materials described above have very high luminous efficiency to convert X-rays into visible light over a range of luminous wavelengths, although the peak of the luminous wavelength is positioned away from 400 nm. Thus, even when a photomultiplier having the sensitivity peak of around 400 nm is used, the Compton scattering X-ray or transmitted X-ray detection sensitivity can be promoted substantially. Further, as shown in FIGS. 2 through 5, as the afterglow of the fluorescent materials described above is as small as less than 1.0 msec., the detection speed can be accelerated when X-rays are detected successively.

By constructing an X-ray examination system using such an X-ray detector, the quality of the examination picture can be improved substantially, the examination accuracy can be improved, and the processing capacity also can be improved.

Embodiment 1

Figure 6:
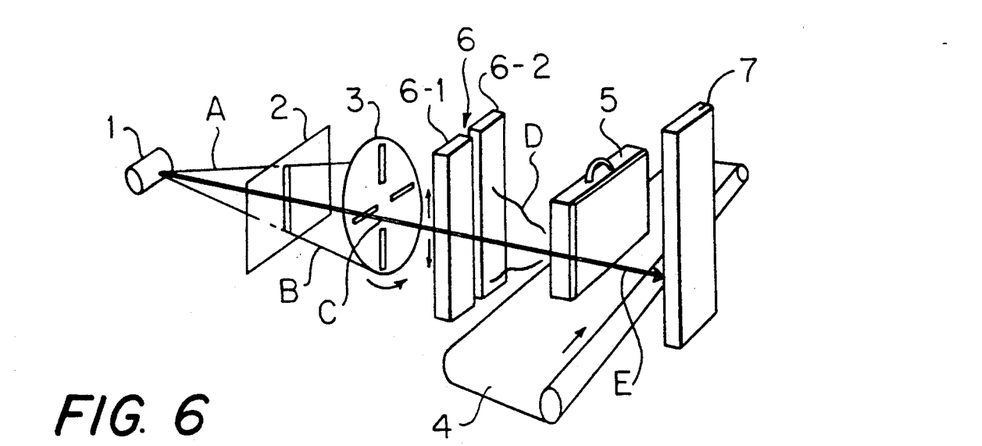
FIG. 6 is a schematic diagram showing the construction of an embodiment of the X-ray examination system of the present invention.

FIG. 6 is a schematic diagram showing the construction of an embodiment of the X-ray examination system of the present invention applied to an airport baggage examination system. An X-ray tube 1 is used as an X-ray irradiation means. An X-ray "A" emitted from the X-ray tube 1 is collimated to a slit shape in a specified width by a linear collimator 2 to provide a collimated X-ray "B." The collimated X-ray "B" is further converted to a pencil beam "C," which repeatedly performs a linear motion, by a rotary collimator 3 having multiple slits provided in radial directions. The pencil beam "C" is emitted to scan an article to be examined, e.g., baggage 5, which is moving along a conveyer 4. Further, the baggage 5 is moved at a speed corresponding to the detection sensitivity of the X-ray.

The X-ray reflected by the baggage 5, that is, the Compton scattering X-ray "D," is detected by a scattering X-ray detector 6 consisting of detectors 6-1 and 6-2. A transmitted X-ray "E" is detected by a transmitted X-ray detector 7. The intensity values of the Compton scattering X-ray "D" and the transmitted X-ray "E" are measured and according to the intensities of these X-rays, the inside status of the baggage 5 is imaged as a picture on a display unit such as a CRT (not shown). Thus, the inside of the baggage 5 is examined according to the picture.

The substances composed mainly of elements with low atomic numbers such as plastics are detected by the Compton scattering X-ray "D," and the metallic products, etc. are detected by the transmitted X-ray "E."

Other detectors to detect the scattering X-ray "D" can be arranged in the position of over the baggage or around the baggage (not shown). These structures are useful to examine the baggage in detail.

The scattering X-ray detector 6 has a construction illustrated in FIG. 7 and described more fully below. The transmitted X-ray detector 7 has a construction similar to that of the scattering X-ray detector 6, however, a separate illustration of transmitted X-ray detector 7 is not provided.

Figure 7:
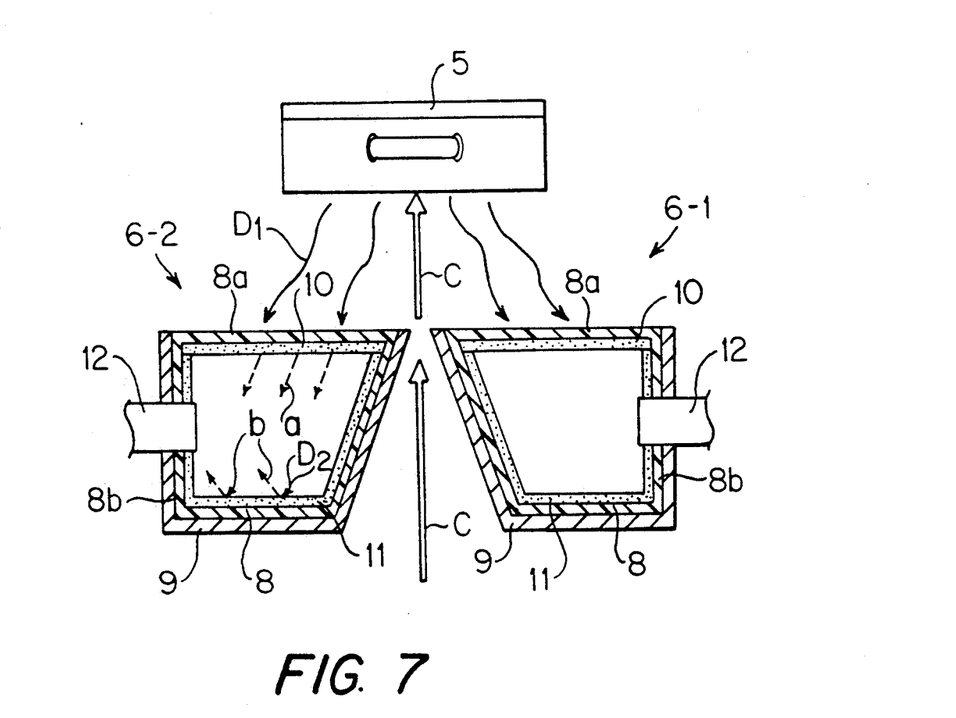
FIG. 7 is a cross-sectional view showing an example of construction of an intensifying screen that is used in an embodiment of the present invention.

With reference to FIG. 7, two scattering X-ray detectors 6-1 and 6-2 are arranged to form a clearance for passing the pencil beam X-ray "C" therebetween. Each of the scattering X-ray detectors 6-1 and 6-2 has a cabinet shape detector body 8 of which one side is pitched. An X-ray incident surface 8a of the detector body 8 confronts the baggage 5, which is the article to be examined. The X-ray incident surface 8a is formed using a material which transmits X-rays, such as a resin or the like.

Other parts of the detector body 8, except for the X-ray incident surface 8a, are composed of a light metal such as aluminum in order to maintain the strength of the detector body 8. Further, the outer surface of the detector body 8, except the X-ray incident surface 8a, is covered by an X-ray shielding material 9 such as lead. Material 9 is provided to eliminate the effect of X-rays coming from the outside of the detector.

On the inside wall surface of the X-ray incident surface 8a, a transmission type intensifying screen 10 with its luminous surface directed toward the inside of the detector body 8 is mounted as a transmission type fluorescent generator. A reflection type intensifying screen 11 is provided on the remaining inner wall surface of the detector body 8, i.e., except on the inner wall surface of the X-ray incident surface 8a, as a reflection type fluorescent generator. A photomultiplier 12 is provided on a side 8b of the detector body 8, which is perpendicular to the X-ray incident surface 8a, as a photoelectric convertor. A photomultiplier having a peak light receiving sensitivity at approximately 400 nm, for example, a model no. R-1037 photomultiplier manufactured by Hamamatsu Photonix Co., is used as the photomultiplier 12.

The operation of scattering X-ray detector 6 is described next with respect to FIG. 7. A Compton scattering X-ray $D_1$ is incident on the transmission type intensifying screen 10 provided on the inner wall surface of the X-ray incident surface $8a$ and a corresponding visible ray "a" generated by the fluorescent material of screen 10 is emitted to the inside of the detector body 8 from the transmission type intensifying screen 10. Similarly, a Compton scattering X-ray $D_2$ transmitted through the X-ray incident surface $8a$ is applied to the reflection type intensifying screen 11 and the visible ray "b" is emitted to the inside of the detector body 8. These visible rays "a" and "b" are detected by the photomultiplier 12 and the intensity of the incident Compton scattering X-ray is obtained by measuring the total intensity of the visible rays "a" and "b".

The principle of detection by the Compton scattering X-ray is described next.

X-rays having an energy $E_0$ and an intensity $I_0$ are attenuated by passing through an absorber, such as a piece of baggage, having a thickness t. The intensity I of the X-rays after attenuation by the absorber is given by the following equation (1):

$$I = I_0 e^{-\mu t} \quad (1)$$

In equation (1), $\mu$ is a coefficient (unit: $cm^{-1}$) specific to the substance and is referred to as a linear absorption coefficient. The coefficient $\mu$ represents a ratio of absorption while X-rays of energy $E_0$ advance 1 cm. Coefficient $\mu$ is larger for substances having larger atomic numbers and is made up of the following terms.

$$\mu = \tau + \sigma_T + \sigma_c + k \quad (2)$$

In equation (2), $\tau$ is an absorption coefficient by the photoelectric coefficient, $\tau_T$ is a scattering coefficient by Thompson scattering, $\tau_c$ is the scattering effect by Compton scattering, and k is an absorption coefficient by the electron pair creation.

Further, when an X-ray of intensity $I_0$ and energy $E_1$ penetrates from the surface of an absorber into a position at the depth x, an intensity $I_1$ of the X-ray at the x position is obtained from the following equation (3):

$$I_1 = I_0 e^{-\mu x} \quad (3)$$

In equation (3), $\mu$ is the above-described linear absorption coefficient of the X-ray of energy $E_1$.

An intensity $I_2$ of the Compton scattering X-ray that is generated at the x position and which scatters in an angular direction against the incident direction of the X-ray is obtained from the following equation (4):

$$I_2 = a \, \sigma_c I_1 \quad (4)$$

In equation (4), "a" is a proportional constant. The intensity $I_3$ of the generated Compton scattering X-ray coming from the surface of the absorber is expressed by the following equation (5) as a function of the distance bx from its generating point within the absorber to the surface of the absorber, where $b = 1/\cos\theta$, and where $\theta$ is an angle between the Compton scattering X-ray and a normal to the surface of the absorber.

$$I_3 = I_2 e^{-\mu' bx} \quad (5)$$

In equation (5), $\mu'$ is the linear absorption coefficient of the scattering X-ray.

Accordingly, the intensity $I_3$ of the Compton scattering X-ray is expressed by the following equation (6) derived from equations (3), (4) and (5):

$$I_3 = a\sigma_c I_0 e^{-(\mu + b\mu')x} \quad (6)$$

Therefore, the total amount of the Compton scattering X-ray after passing through an absorber having thickness t is provided by the following equations (7) and (8):

$$
\begin{aligned}
C &= \int_0^t I_3 \, dx \\
&= \int_0^t a \, \sigma_c I_0 \, e^{-(\mu + b\mu')x} \, dx \\
&= \frac{a \, \sigma_c I_0}{\mu + b\mu'} (1 - e^{-(\mu + b\mu')t})
\end{aligned}
\quad (7)
$$

in the case of $e^{-(\mu + b\mu')t} \ll 1$ $$C = \frac{a \, \sigma_c I_0}{\mu + b\mu'} \quad (8)$$

Since $aI_0$ is a constant value that is independent of atomic number, the intensity of the Compton scattering X-ray varies depending upon a value of $\sigma_c/(\mu + b\mu')$ which changes according to the substance. The value of the $\sigma_c/(\mu + b\mu')$ becomes larger for substances having smaller atomic numbers. Therefore, it is possible to identify a substance composed mainly of an element having a small atomic number, such as plastic products, by detecting the Compton scattering X-rays.

Figure 8:
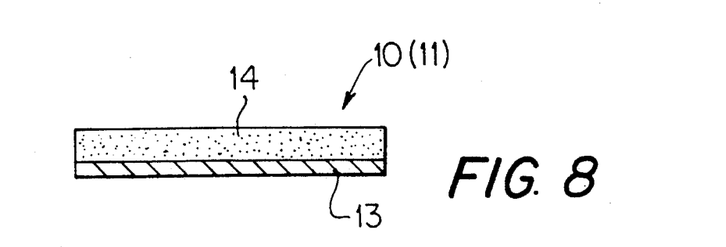
FIG. 8 is a cross-sectional view showing the construction of an embodiment of an X-ray detector of the present invention.

As shown in FIG. 8, intensifying screens 10 and 11 include a fluorescent material layer 14 formed by coating a slurry of selected fluorescent material(s) mixed with a binder and organic solvent onto a supporting material 13 such as a plastic film or a nonwoven fabric.

Figure 9:
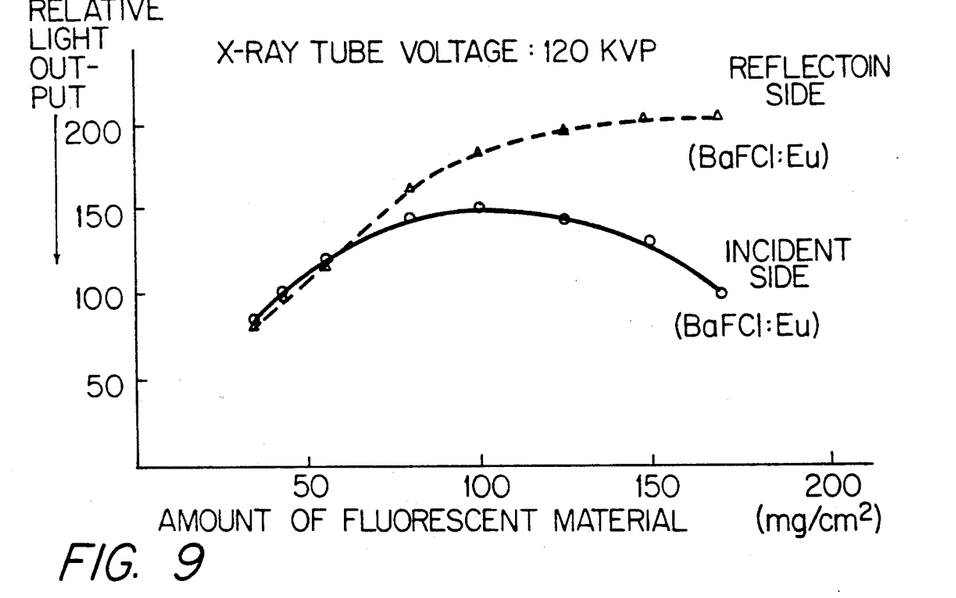
FIG. 9 is a diagram showing the relation between the amount of fluorescent material coating on intensifying screens and relative light output, in an embodiment of the present invention.

The amount of fluorescent material to be coated on the above transmission type intensifying screen 10 and the reflection type intensifying screen 11 is preselected for each type of intensifying screen. If an excessive amount of fluorescent material is selected for the incident side of the transmission type intensifying screen 10, optical absorption takes place in the fluorescent material layer 14, thereby lowering the fluorescent light output. Further, when an excessive amount of fluorescent material is used, the Compton scattering X-ray is also absorbed, reducing the incident amount to the reflection type intensifying screen 11, so that the total amount of the visible light is decreased. On the reflection type intensifying screen 11, the light output increases with an increase of the amount of coating of fluorescent material, but no additional effect can be obtained if too much fluorescent material is coated. The light outputs of the transmission type intensifying screen 10 and the reflection type intensifying screen 11 when BaFCl:Eu was used as the fluorescent material are shown in FIG. 9. Further, the light outputs are shown as relative optical outputs to a light output assumed to be 100, of a conventional fluorescent material (LaOBr:Tm) measured at an X-ray tube voltage 120 kVP using a model no R-980 photomultiplier manufactured by Hamamatsu Photonix Co., that has a bialkali photoelectric surface.

Figure 10:
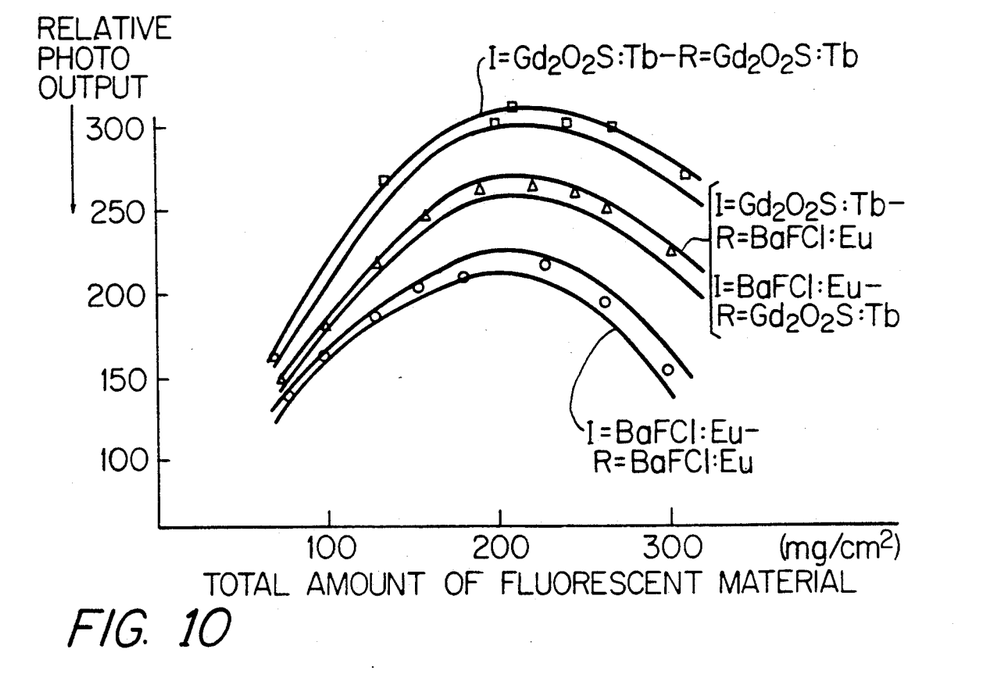
FIG. 10 is a diagram showing the relation between the total coating amount of fluorescent materials on the incident side intensifying screen and the reflection side intensifying screen in an embodiment of the present invention.

Further, because the total amount of visible light changes depending on the balance with the coating amount of the transmission type intensifying screen 10 and the reflection type intensifying screen 11 as described above, it is desirable to set the total coating amount of fluorescent material by considering the respective coating amounts of the transmission type intensifying screen 10 and the reflection type intensifying screen 11. FIG. 10 shows the relation between the total coating amount of combined representative fluorescent materials on the transmission type intensifying screen 10 and the reflection type intensifying screen 11 and the relative light output. In FIG. 10, I represents incident side and R represents reflection side. It can be seen that a satisfactory light output is obtained by setting the total coating amount in the range from 80 to 300 mg/cm$^2$ although it varies depending on the combination of fluorescent materials.

Figure 11:
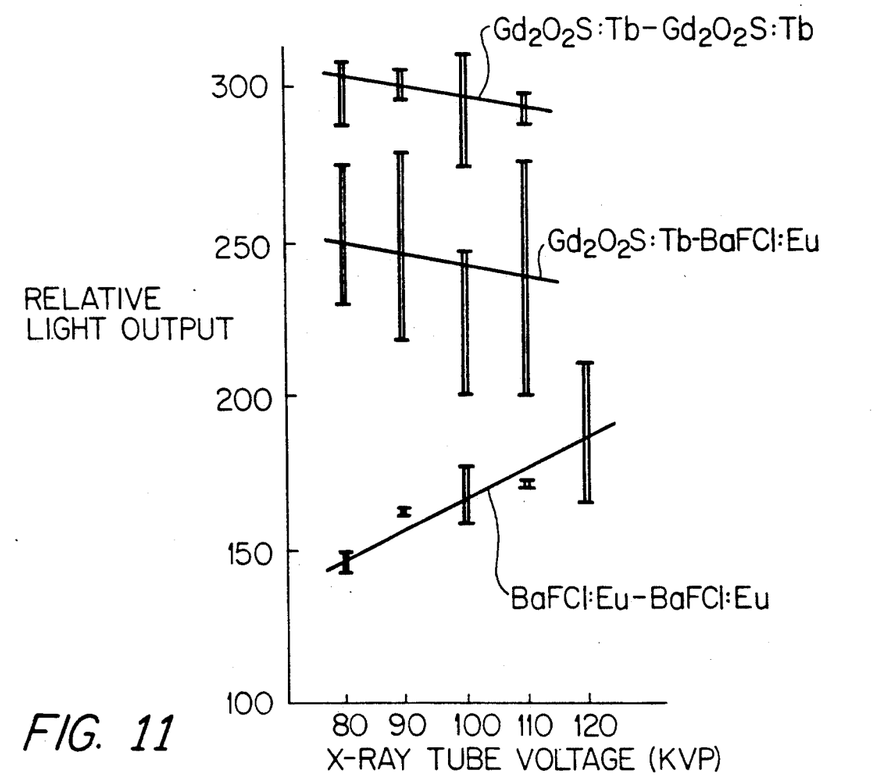
FIG. 11 is a diagram showing relative optical output of fluorescent materials used in the present invention.

The relative light outputs of the transmission type intensifying screen 10 and the reflection type intensifying screen 11 manufactured by combining various fluorescent materials in various ways of the present invention are as shown in Tables 1 to 5 and FIG. 11.

TABLE 1

| Incident side intensifying screen | | Reflection side intensifying screen | | Relative light output X-ray tube Voltage (Kvp) | | | | |
|---|---|---|---|---|---|---|---|---|
| Fluorescent | Coating amount (mg/cm2) | Fluorescent | Coating amount (mg/cm2) | 80 | 90 | 100 | 110 | 120 |
| LaOBr:Tm | — | LaOBr:Tm | — | 100 | 100 | 100 | 100 | 100 |
| BaFCl:Eu | 35 | BaFCl:Eu | 65 | 146 | — | 159 | — | 165 |
| " | 65 | " | 65 | 150 | 163 | 177 | 184 | 188 |
| " | 65 | " | 90 | 165 | 180 | 195 | 205 | 205 |
| " | 90 | " | 90 | 178 | 195 | 203 | 210 | 210 |
| " | 90 | " | 140 | 182 | 201 | 210 | 215 | 217 |
| " | 125 | " | 140 | 165 | 173 | 188 | 193 | 195 |
| " | 125 | " | 175 | 105 | 130 | 137 | 148 | 150 |
| Gd$_2$O$_2$S:Tb | 35 | Gd$_2$O$_2$S:Tb | 35 | 158 | 161 | 163 | 165 | 161 |
| " | 50 | " | 50 | 199 | 197 | 201 | 205 | 210 |
| " | 50 | " | 85 | 255 | 280 | 284 | 268 | 270 |
| " | 50 | " | 115 | 255 | 280 | 288 | 291 | 295 |
| " | 50 | " | 160 | 286 | 303 | 307 | 311 | 313 |
| " | 85 | " | 85 | 275 | 278 | 280 | 286 | 291 |
| " | 85 | " | 115 | 293 | 305 | 301 | 298 | 301 |
| " | 85 | " | 160 | 309 | 318 | 307 | 309 | 301 |
| " | 115 | " | 160 | 283 | 295 | 303 | 305 | 301 |
| Gd$_2$O$_2$S:Pr | 50 | Gd$_2$O$_2$S:Pr | 85 | 215 | 223 | 239 | 233 | 230 |
| " | 50 | " | 115 | 238 | 243 | 254 | 251 | 260 |
| " | 50 | " | 160 | 244 | 251 | 260 | 265 | 258 |
| " | 85 | " | 85 | 227 | 238 | 243 | 248 | 241 |
| Gd$_2$O$_2$S:Pr | 85 | Gd$_2$O$_2$S:Pr | 115 | 257 | 266 | 273 | 271 | 275 |
| " | 85 | " | 160 | 263 | 271 | 277 | 275 | 271 |
| " | 115 | " | 160 | 249 | 257 | 259 | 248 | 249 |
| La$_2$O$_2$S:Tb | 85 | La$_2$O$_2$S:Tb | 115 | 243 | 259 | 256 | 253 | 255 |
| La$_2$O$_2$S:Pr | 85 | La$_2$O$_2$S:Pr | 115 | 253 | 248 | 255 | 257 | 253 |
| Y$_2$O$_2$S:Tb | 85 | Y$_2$O$_2$S:Pr | 115 | 183 | 197 | 211 | 205 | 205 |
| Gd$_2$O$_2$S:Tb | 50 | BaFCl:Eu | 90 | 267 | 279 | 277 | 276 | 271 |
| BaFCl:Eu | 65 | Gd$_2$O$_2$S:Tb | 115 | 236 | 245 | 251 | 261 | 257 |
| Gd$_2$O$_2$S:Tb | 85 | Gd$_2$O$_2$S:Pr | 115 | 273 | 288 | 291 | 293 | 285 |

TABLE 2

| Incident side intensifying screen | | Reflection side intensifying screen | | Relative light output X-ray tube Voltage (Kvp) | | | | |
|---|---|---|---|---|---|---|---|---|
| Fluorescent | Coating amount (mg/cm2) | Fluorescent | Coating amount (mg/cm2) | 80 | 90 | 100 | 110 | 120 |
| BaFBr:Eu | 25 | BaFBr:Eu | 50 | 160 | 165 | 168 | 171 | 165 |
| " | 35 | " | 50 | 185 | 188 | 193 | 195 | 190 |
| " | 35 | " | 65 | 201 | 205 | 210 | 215 | 210 |
| " | 50 | " | 65 | 240 | 245 | 250 | 258 | 255 |
| " | 50 | " | 80 | 265 | 270 | 280 | 295 | 290 |
| " | 65 | " | 80 | 270 | 277 | 283 | 300 | 295 |
| " | 65 | " | 100 | 280 | 285 | 290 | 305 | 298 |
| " | 80 | " | 100 | 285 | 293 | 301 | 315 | 310 |
| " | 80 | " | 120 | 293 | 298 | 305 | 318 | 315 |
| " | 100 | " | 120 | 283 | 290 | 300 | 305 | 303 |
| " | 100 | " | 150 | 271 | 275 | 284 | 298 | 290 |
| " | 120 | " | 150 | 260 | 265 | 271 | 275 | 270 |
| " | 120 | " | 180 | 230 | 238 | 246 | 255 | 250 |
| " | 150 | " | 180 | 210 | 215 | 220 | 225 | 210 |
| " | 180 | " | 180 | 180 | 186 | 191 | 197 | 191 |

TABLE 3

| Incident side intensifying screen | | Reflection side intensifying screen | | Relative light output X-ray tube Voltage (Kvp) | | | | |
|---|---|---|---|---|---|---|---|---|
| Fluorescent | Coating amount (mg/cm2) | Fluorescent | Coating amount (mg/cm2) | 80 | 90 | 100 | 110 | 120 |
| Y$_2$O$_2$S:Tb | 25 | Y$_2$O$_2$S:Tb | 50 | 165 | 171 | 176 | 183 | 175 |
| " | 50 | " | 80 | 263 | 270 | 278 | 285 | 280 |
| " | 80 | " | 100 | 275 | 283 | 290 | 305 | 310 |
| " | 80 | " | 125 | 305 | 316 | 325 | 330 | 320 |
| " | 100 | " | 125 | 321 | 325 | 331 | 341 | 335 |
| " | 100 | " | 160 | 326 | 334 | 341 | 351 | 343 |
| " | 125 | " | 160 | 318 | 323 | 329 | 335 | 330 |
| " | 125 | " | 200 | 301 | 305 | 309 | 316 | 310 |

TABLE 4

| Incident side intensifying screen | | Reflection side intensifying screen | | Relative light output X-ray tube Voltage (Kvp) | | | | |
|---|---|---|---|---|---|---|---|---|
| Fluorescent | Coating amount (mg/cm2) | Fluorescent | Coating amount (mg/cm2) | 80 | 90 | 100 | 110 | 120 |
| Gb$_2$O$_2$S:Pr | 25 | BaFBr:Eu | 50 | 140 | 145 | 148 | 153 | 150 |
| " | 50 | " | 50 | 183 | 187 | 193 | 196 | 195 |
| " | 50 | " | 80 | 241 | 245 | 250 | 259 | 255 |
| " | 65 | " | 80 | 247 | 251 | 259 | 265 | 260 |
| " | 85 | " | 100 | 263 | 268 | 273 | 280 | 275 |
| " | 85 | " | 120 | 275 | 280 | 285 | 293 | 290 |
| " | 115 | " | 120 | 288 | 295 | 306 | 315 | 310 |
| " | 115 | " | 150 | 285 | 293 | 303 | 310 | 305 |
| " | 130 | " | 150 | 275 | 281 | 286 | 295 | 290 |
| " | 160 | " | 180 | 245 | 256 | 265 | 278 | 271 |

TABLE 5

| Incident side intensifying screen BaFCl:Eu Coating Amount (mg/cm$^2$) | Reflection side intensifying screen Gd$_2$O$_2$S:Tb Coating Amount (mg/cm$^2$) | Relative light output (X-ray tube voltage 120 KVP) | Incident side intensifying screen Gd$_2$O$_2$S:Tb Coating Amount (mg/cm$^2$) | Reflection side intensifying screen BaFCl:Eu Coating Amount (mg/cm$^2$) | Relative light output (X-ray tube voltage 120 KVP) |
|---|---|---|---|---|---|
| 35 | 35 | 148 | 35 | 35 | 145 |
| 35 | 50 | 165 | 35 | 65 | 180 |
| 35 | 85 | 220 | 35 | 90 | 210 |
| 35 | 115 | 245 | 35 | 120 | 245 |
| 35 | 160 | 270 | 50 | 35 | 165 |
| 65 | 35 | 180 | 50 | 65 | 195 |
| 65 | 50 | 205 | 50 | 90 | 230 |
| 65 | 85 | 240 | 50 | 120 | 250 |
| 65 | 115 | 260 | 85 | 35 | 210 |
| 65 | 160 | 270 | 85 | 65 | 235 |
| 90 | 35 | 210 | 85 | 90 | 260 |
| 90 | 50 | 230 | 85 | 120 | 285 |
| 90 | 85 | 260 | 115 | 35 | 230 |
| 90 | 115 | 270 | 115 | 65 | 250 |
| 90 | 160 | 260 | 115 | 90 | 260 |
| 125 | 35 | 240 | 115 | 120 | 255 |
| 125 | 50 | 250 | 160 | 35 | 245 |
| 125 | 85 | 280 | 160 | 65 | 250 |
| 125 | 115 | 250 | 160 | 90 | 240 |
| 125 | 160 | 225 | 160 | 120 | 230 |

As is clear from Tables 1 to 5 and FIG. 11, the light output can be improved more substantially than conventional fluorescent materials when the fluorescent materials of the present invention are used. The substantial improvement of the light output promotes the Compton scattering X-ray detection sensitivity and makes it possible to clearly image the inside of an article to be examined, such as baggage. This also applies to the transmitted X-ray detection sensitivity. It becomes therefore possible to execute more accurate examinations. Further, improvement of the light output makes it possible to lower the capacity of the X-ray tube and an X-ray examination system can be downsized. Additionally, as shown in FIGS. 2 through 5, as afterglows of the fluorescent materials utilized in accordance with the present invention are as small as below 1.0 msec., the moving speed of the baggage can be accelerated and thereby the processing capacity of an X-ray examination system can be improved substantially.

Further, in the above embodiment, an example with the X-ray detector of the present invention applied to a scattering X-ray detector has been explained. When the X-ray detector is used as a transmitted X-ray detector, the same effect can be obtained by constructing the system in accordance with the structure disclosed above. Further, the X-ray examination system of the present invention is not limited to the airport baggage examination system but is useful for other types of examination systems.

The present invention has been described with respect to specific embodiments. However, other embodiments based on the principles of the present invention should be obvious to those of ordinary skill in the art. Such embodiments are intended to be covered by the claims.

We claim:

1. An X-ray detector comprising:
    a housing;
    a fluorescent generator, mounted in said housing, for generating a fluorescent output in response to X-rays impinged thereon, said fluorescent generator having a peak luminous wavelength;
    a photomultiplier, mounted in said housing, for converting the output of the fluorescent generator to electrical image signals, said photomultiplier having a peak wavelength sensitivity independent of said peak luminous wavelength;
    wherein said fluorescent generator includes at least one fluorescent material selected from the group consisting of:

$A_2O_2S:D$ and $BaFX:E$ wherein
    A is at least one element selected from Gd, La and Y,
    D is at least one element selected from Tb and Pr, or,
    D is at least one element selected from Tb and Pr, and at least one element selected from Ce and Yb,
    X is at least one element selected from Cl and Br,
    E is Eu or a mixture of Eu and at least one element selected from the group consisting of Ce and Yb.

2. The X-ray detector of claim 1, wherein said fluorescent material comprises a material selected from the group consisting of: $Gd_2O_2S:Tb$; $Gd_2O_2S:Tb$, Cl; $Gd_2O_2S:Pr$; $BaFCl:Eu$; $BaFBr:Eu$; $La_2O_2S:Tb$; $La_2O_2S:Tb$, Ce; $La_2O_2S:Pr$; $Y_2O_2S:Tb$; $Y_2O_2S:Tb$, Yb; $Y_2O_2S:Tb$, Ce; and $Y_2O_2S:Pr$.

3. The X-ray detector of claim 1, wherein the fluorescent generator comprises a transmission type fluorescent generator.

4. The X-ray of detector of claim 1, wherein the fluorescent generator comprises a reflection type fluorescent generator.

5. The X-ray detector of claim 1, wherein the fluorescent generator includes an intensifying screen comprised of said fluorescent material.

6. The X-ray detector of claim 5, wherein the amount of said fluorescent material is in the range of 80 $mg/cm^2$ to 300 $mg/cm^2$.

7. The X-ray detector of claim 1, wherein said fluorescent material has an afterglow time of 1.0 msec. or less.

8. The X-ray detector of claim 1, wherein the detector detects Compton scattering X-rays.

9. A system for examining an object with X-rays, said system comprising:
    an X-ray source for irradiating the object to be examined with X-rays;
    an X-ray detector for detecting Compton scattering X-rays from the object and for generating image signals based on the detected Compton scattering X-rays;
    a display for displaying an image of the interior of the object in accordance with said image signals generated by the X-ray detector,
    wherein the X-ray detector includes
    a housing,
    a fluorescent generator, mounted in said housing, for generating a fluorescent output in response to X-rays impinged thereon, said fluorescent generator having a peak luminous wavelength,
    a photomultiplier, mounted in said housing, for converting the output of the fluorescent generator to electrical image signals, and for providing said image based on the electric signals, said photomultiplier having a peak wavelength sensitivity independent of said peak luminous wavelength,
    wherein said fluorescent generator includes at least one fluorescent material selected from the group consisting of:

$A_2O_2S:D$ and $BaFX:E$ wherein
    A is at least one element selected from Gd, La and Y,
    D is at least one element selected from Tb and Pr, or,
    D is at least one element selected from Tb and Pr, and at least one element selected from Ce and Yb,
    X is at least one element selected from Cl and Br,
    E is Eu or a mixture of Eu and at least one element selected from the group consisting of Ce and Yb.

* * * * *

UNITED STATES PATENT AND TRADEMARK OFFICE
CERTIFICATE OF CORRECTION

PATENT NO. : 5,302,817
DATED : April 12, 1994
INVENTOR(S) : Kazuto Yokota et al.

It is certified that error appears in the above-indentified patent and that said Letters Patent is hereby corrected as shown below:

Claim 2, column 11, line 43, change "$Gd_2O_2S:Pr_r$" to --$Gd_2O_2S:Pr$--.

Signed and Sealed this

Seventeenth Day of January, 1995

Attest:

BRUCE LEHMAN

Attesting Officer

Commissioner of Patents and Trademarks